(12) United States Patent
Tyrrell

(10) Patent No.: US 12,413,132 B2
(45) Date of Patent: Sep. 9, 2025

(54) CIRCUITS AND METHODS FOR PFM OPERATION

(71) Applicant: Renesas Design (UK) Limited, Bourne End (GB)

(72) Inventor: Julian Tyrrell, Swindon (GB)

(73) Assignee: Renesas Design (UK) Limited, Bourne End (GB)

( * ) Notice: Subject to any disclaimer, the term of this patent is extended or adjusted under 35 U.S.C. 154(b) by 274 days.

(21) Appl. No.: 18/083,105

(22) Filed: Dec. 16, 2022

(65) Prior Publication Data

US 2024/0204664 A1  Jun. 20, 2024

(51) Int. Cl.
*H02M 3/158*   (2006.01)
*H02M 1/00*    (2006.01)

(52) U.S. Cl.
CPC ......... *H02M 1/0032* (2021.05); *H02M 3/158* (2013.01)

(58) Field of Classification Search
CPC .............................. H02M 1/0032; H02M 3/158
See application file for complete search history.

(56) References Cited

U.S. PATENT DOCUMENTS

| | | | |
|---|---|---|---|
| 2008/0022139 A1* | 1/2008 | Lin | H02M 3/1588 713/320 |
| 2012/0223691 A1* | 9/2012 | Weinstein | H02M 1/44 323/283 |
| 2019/0238054 A1* | 8/2019 | Flaibani | H02M 3/156 |

* cited by examiner

*Primary Examiner* — Alex Torres-Rivera
(74) *Attorney, Agent, or Firm* — SCULLY, SCOTT, MURPHY & PRESSER, P.C.

(57) ABSTRACT

Described herein is a power converter operable in a pulse frequency modulation (PFM) mode. The power converted may be configured for maintaining a PFM frequency above a predetermined frequency threshold when a load current at an output node of the power converter decreases. The power converter may comprise an inductor. The power converter may be configured to, in a PFM switching cycle: during a positive charge phase of the PFM switching cycle, generate a positive charge across the inductor; and during a negative charge phase of the PFM switching cycle, generate a negative charge across the inductor smaller than or equal to the positive charge, such that a total net charge transferred to the output node during the PFM switching cycle is reduced, so as to maintain the PFM frequency above the predetermined frequency threshold.

15 Claims, 12 Drawing Sheets

CIRCUITS AND METHODS FOR PFM OPERATION

TECHNICAL FIELD

The present disclosure is generally directed to techniques related to pulse frequency modulation (PFM) operation, and more particularly to power converters configured with PFM and corresponding methods for operating such power converters.

BACKGROUND

In a broad sense, when power converters (e.g., buck converters or the like) have light loading, a commonly adopted operation is to implement a discontinuous conduction scheme, which is often referred to as a pulse frequency modulation (PFM) mode. Generally speaking, in this mode a simple comparator (or the like) may be used to determine whether the output voltage (hereinafter denoted as VOUT) is below a target value (e.g., predetermined or predefined), and correspondingly perform a single switching cycle. The next switching cycle would be performed as soon as it is detected that the output voltage drops below the target voltage.

Each switching cycle may be considered to have a fixed amount of charge (hereinafter denoted as Q) that is transferred (from the input or power supply) to the output. This would generally result in a periodic repetition of switching cycles of the PFM operation for a given load. Such a fixed repetition frequency $PFM_{FREQ}$ may sometimes be determined (e.g., calculated) according to the following equation (1):

$$PFM_{FREQ} = I_{LOAD}/Q, \qquad (1)$$

where $I_{LOAD}$ denotes a load current (i.e., the current at the load of the power converter).

Thus, as can be seen from the above equation (1), the PFM frequency (or in other words, the rate of PFM cycles per second) may be understood to be proportional to the load current.

In some possible applications, the PFM frequency may be interference to the system being powered. For example, in some possible audio systems, a frequency of <20 kHz may produce tones that could be heard (audible or perceivable). As another example, in some possible touchscreen applications, sensor interference may affect the scanning and detection operations, in particular if the scanning frequency of the touchscreen and the PFM frequency are of similar value.

Therefore, in order to prevent the PFM switching from causing interference to such possible applications, a minimum operational PFM frequency may have to be specified.

In order to keep the PFM frequency above a predefined limit, one possible solution may be to measure the PFM cycle period, and if this drops below a predefined level, add an additional static (or variable) load to the output, in order to guarantee the minimum frequency is met for all load currents below this level. However, one of the major downsides of such a solution is that system efficiency, particularly when this additional load current is applied, would drop significantly.

In view thereof, broadly speaking, the focus of the present disclosure is to propose implementations of power converters configured in PFM, and to techniques and/or mechanisms for efficient operation of such power converters configured in PFM, particularly at low load conditions.

SUMMARY

In view of some or all of the above technical problems, broadly speaking, the present disclosure generally provides a power converter being operated in a pulse frequency modulation (PFM) mode, a corresponding method for operating such a power converter, a program, as well as a computer-readable storage medium, having the features of the respective independent claims.

According to an aspect of the disclosure, there is provided a power converter operable in a pulse frequency modulation mode (PFM). The power converter may for example be a buck converter (e.g., a DC (direct current)-DC buck converter), a boost convert, or the like, as can be understood and appreciated by the skilled person. Particularly, the power converted may be configured for enabling maintaining of a PFM frequency above a predetermined (or predefined, pre-configured, etc.) frequency threshold when a load current at an output node of the power converter decreases/drops. The power converter may comprise, among others, an inductor (or an inductive element implemented in any suitable form).

In particular, the power converter may be configured to, in a PFM (switching) cycle, particularly during a positive charge phase of the PFM switching cycle, generate a positive charge across the inductor. Depending on various implementations, such positive charge may for example be generated by a positive current flowing through the inductor in a (positive) direction from an input node (e.g., supply) of the power converter to the output node (e.g., load) of the power converter, or in any other suitable manner, as can be understood and appreciated by the skilled person.

The power converter may be further configured to, during a negative charge phase of the PFM switching cycle, generate a negative charge across the inductor. Similar to the positive charge generation, such negative charge may be, depending on various implementations, generated by a negative current flowing through the inductor in a (negative) direction from the output node of the power converter to the input node of the power converter, or in any other suitable manner, as can also be understood and appreciated by the skilled person.

More particularly, the negative charge (or specifically, an (absolute) magnitude thereof) may be smaller than the positive charge (or specifically, an (absolute) magnitude thereof), such that a total net charge (which might be positive or zero, depending on the negative charge generated) that is transferred (from the supply/input node) to the output (load) node during the PFM switching cycle may be reduced (e.g., in comparison with cases where only a positive charge is generated but no negative charge, for example during normal operations when the PFM frequency is above the predetermined frequency threshold), so as to maintain the PFM frequency above the predetermined frequency threshold. Notably, it may be worth mentioning that, the negative charge phase may be, but does not necessarily always have to be, triggered or enabled for a particular PFM switching cycle. For instance, in some possible implementations, when the PFM frequency is above the predetermined frequency threshold, it may be possible that only the positive charge phase is implemented or enabled. On the other hand, in order to avoid the PFM frequency from dropping below the predetermined frequency threshold (e.g., due to the decrease of the load current), the negative charge phase may be triggered or enabled in order to reduce the total net charge transferred during the PFM switching cycle as illustrated above, thereby maintaining the PFM frequency to be above a predetermined frequency threshold even when the load current drops (e.g., in low load conditions).

It may be further worth mentioning that, within a specific PFM switching cycle, the positive charge phase may be, but does not necessarily have to be, before the negative charge phase. Put differently, depending on various implementations and/or requirements, in some possible PFM switching cycle(s) the positive charge may be generated first (i.e., before the negative charge); while in some other possible PFM switching cycle(s) the negative charge may be generated first (i.e., before the positive charge), as long as (the magnitude of) the negative charge is smaller than or (at most) equal to (the magnitude of) the positive charge, thereby ensuring that the total net charge transfer to the output during a PFM switching cycle is reduced. As will be discussed in more detail below, in some possible implementations, the extent to which the net charge is reduced may be controlled (e.g., adaptively or continuously) in accordance with the change of the load current.

Configured as proposed above, broadly speaking, the present disclosure generally provides an implementation of a power converter (e.g., a digital buck converter) with improved efficiency especially at low load, particularly in cases when the PFM frequency has to be (e.g., artificially) enabled to be maintained above a (predetermined or pre-defined) minimum/threshold. In general, this is considered achievable by the reduction in the charge Q per PFM cycle, using both a positive and negative contributor to the total as proposed herein. This has the effect of reducing the value of $I_{LOAD}$ that can be supported whilst meeting the minimum PFM frequency requirement.

In some possible embodiments, the power converter may further comprise a high side switching device and a low side switching device. The high side and low side switching devices may each be implemented in any suitable form, such as a transistor (e.g., a MOSFET) or the like. The high side switching device and the low side switching device may be coupled (in series) between an input node and a reference node (e.g., GND or any other suitable reference point/node) of the power converter. In particular, the inductor may be coupled between the output node and an intermediate node that is arranged between the high side switching device and the low side switching device.

In some possible embodiments, the power converter may be configured to, during the positive charge phase, switch the high side switching device to an ON state (e.g., a conducting state) for a first time period (before the high side switching device is switched off (to an OFF state)) such that a positive charge current across the inductor (in the direction from the input/supply to the output/load) is generated, thereby charging the inductor. Subsequently, the power converter may be configured to (during the positive charge phase) switch the low side switching device to the ON state for a second time period (before the low side switching device is switched off) for discharging the inductor to zero current (across the inductor). Moreover, the power converter may be further configured to, during the negative charge phase, switch the low side switching device to the ON state for a third time period, thereby generating a negative charge current across the inductor (or in other words, the current flows in the direction from the output/load to the input/supply). In that case, it may also be considered that the charge/energy is transferred from the load to the supply, as can be understood and appreciated by the skilled person. Notably, in some possible implementations where the third time period is immediately after the second time period (e.g., the positive charge phase is before the negative charge phase), it may also be seen that the second time period is extended for the third time period, such that the inductor is first discharged to zero current and subsequently continued to be charged but in the reverse (negative) direction.

Subsequently, the power converter may be configured to further (during the negative charge phase) switch the high side switching device to the ON state for a fourth time period, thereby discharging the inductor until zero current across the inductor is reached again. As noted above, the positive charge phase and the negative charge phase may be implemented in either sequence. As a result, although the complete one PFM switching cycle may be understood to comprise the first through fourth time periods, the actual sequence of those time periods may differ, depending on various implementations and/or requirements.

In some possible embodiments, the power converter may further be configured to set the fourth time period as a first fixed ratio (e.g., less than 1) of the first time period, and to determine the third time period based on the set fourth time period. Configured as proposed, it may be guaranteed that the negative charge phase is less than the positive charge phase, which always gives a net positive charge contribution to the output. In some possible cases, a static active load (albeit at a much lower current) may still be considered necessary, for example in order to satisfy the minimum PFM frequency at some point.

In some possible embodiments, the power converter may further be configured to first determine a peak negative current during the third and fourth time periods (or more precisely, at the end of the third time period or at the beginning of the fourth time period) based on the fourth time period (which has been set to a fixed ratio of the first time period). Subsequently, the third time period may be determined based on the determined peak negative current.

In some possible embodiments, setting the fourth time period as the first fixed ratio of the first time period may not be sufficient for maintaining the PFM frequency above the predetermined frequency threshold (e.g., when the load current further drops in some possible cases). In such cases, the power converter may be further configured to set the fourth time period as a second fixed ratio of the first time period larger than the first fixed ratio. Broadly speaking, by setting the fourth time period to be a larger ratio of the first time period, it generally means that more negative charge would be generated and effectively less/smaller total net charge would be transferred to the output during one PFM switching cycle. Consequently, as can be deducted from equation (1), the PFM frequency could be correspondingly increased (by reducing the total charge Q), thereby being able to be maintained above the PFM frequency threshold. Notably, in some possible implementations, in order to allow the power converter (or the overall system) to switch back as the load current may increase (so increasing the PFM cycle rate), a (predetermined or predefined) hysteretic (frequency) threshold may be used. This hysteretic transition would generally be able to eliminate mode switch jitter for example in cases where the load current may sit at the transition point.

In some possible embodiments, the power converter may be configured to determine (e.g., adjust) a peak negative current during the third and fourth time periods based on the PFM frequency, and to determine the third and fourth time periods based on the adjusted peak negative current. For instance, in some possible implementations, the (operational) PFM frequency may be measured or monitored (e.g., periodically) by using any suitable means, such that the peak negative current may be continuously (e.g., periodically) adjusted in accordance with the changing PFM frequency. Configured as proposed, a continuous adjustment of the charge delivered to the output may be implemented, for example using a variable peak negative current value. This technique may generally allow the minimum of the PFM frequency requirement to be satisfied even down to zero load current without the need for a static active load.

In some possible embodiments, the adjustment of the peak negative current may involve increasing the peak negative current for maintaining the PFM frequency above the predetermined frequency threshold. Additionally or alternatively, the adjustment of the peak negative current may involve decreasing the peak negative current when the PFM frequency is above a predetermined hysteresis frequency threshold. As illustrated above, in some possible implementations, this hysteresis frequency threshold may be needed in order to correctly switch modes of operation as the load current might change. Further, the adjustment (increasing and/or decreasing) may be implemented by using any suitable means. For instance, in some possible examples, such incremental or decremental may be implemented as simply as a corresponding +/−Δ (fixed or variable) step function. In some other possible examples, more complex functions may also be implemented, e.g., in accordance with the difference between the measured and target PFM frequencies.

In some possible embodiments, the PFM switching cycle may be triggered when (or whenever) an output voltage at the output node of the power converter is below a predetermined voltage threshold, as can also be understood and appreciated by the skilled person.

In some possible embodiments, the predetermined frequency threshold may be set to 20 KHz (for example in some possible audio systems as illustrated above). However, as can be understood and appreciated by the skilled person, any other suitable frequency threshold may be determined or defined, depending on various implementations and/or requirements.

In some possible embodiments, the power converter may be a buck converter. Particularly, in some possible examples, the buck converter may be a digitally controlled (DC-DC) buck converter. However, as noted earlier, any other suitable power converter implementations (e.g., a boost converter) may be considered applicable as well, possibly with suitable adaptation (or modification) wherever appropriate.

According to another aspect of the present disclosure, there is provided a method for operating a power converter that is configured in a pulse frequency modulation (PFM) mode. The power converter may for example be a buck converter (e.g., a DC (direct current)-DC buck converter), a boost convert, or the like, as can be understood and appreciated by the skilled person. Particularly, the method may be configured for enabling maintaining of a PFM frequency of the power converter to be above a predetermined (or predefined, preconfigured, etc.) frequency threshold when a load current at an output node of the power converter decreases/drops. The power converter may comprise, among others, an inductor (or an inductive element implemented in any suitable form).

In particular, the method may comprise, in a PFM switching cycle, during a positive charge phase of the PFM switching cycle, generating a positive charge across the inductor. Depending on various implementations, such positive charge may for example be generated by a positive current flowing through the inductor in a (positive) direction from an input node (e.g., supply) of the power converter to the output node (e.g., load) of the power converter, or in any other suitable manner, as can be understood and appreciated by the skilled person.

The method may further comprise, during a negative charge phase of the PFM switching cycle, generating a negative charge across the inductor. Similar to the positive charge generation, such negative charge may be, depending on various implementations, generated by a negative current flowing through the inductor in a (reverse/negative) direction from the output node of the power converter to the input node of the power converter, or in any other suitable manner, as can also be understood and appreciated by the skilled person.

More particularly, the negative charge (or specifically, an (absolute) magnitude thereof) may be smaller than the positive charge (or specifically, an (absolute) magnitude thereof), such that a total net charge (which might be positive or zero, depending on the negative charge generated) that is transferred (from the supply/input node) to the output (load) node during the PFM switching cycle may be reduced (e.g., in comparison with cases where only a positive charge is generated but no negative charge, for example during normal operations when the PFM frequency is above the predetermined frequency threshold). Notably, it may be worth mentioning that, the negative charge phase may be, but does not necessarily always have to be, triggered or enabled for a particular PFM switching cycle. For instance, in some possible implementations, when the PFM frequency is above the predetermined frequency threshold, it may be possible that only the positive charge phase is implemented or enabled. On the other hand, in order to avoid the PFM frequency from dropping below the predetermined frequency threshold (e.g., due to the decrease of the load current), the negative charge phase may be triggered or enabled in order to reduce the total net charge transferred during the PFM switching cycle as illustrated above, thereby maintaining the PFM frequency to be above a predetermined frequency threshold even when the load current drops (e.g., in low load conditions).

It may be further worth mentioning that, within a specific PFM switching cycle, the positive charge phase may be, but does not necessarily have to be, before the negative charge phase. Put differently, depending on various implementations and/or requirements, in some possible PFM switching cycle(s) the positive charge may be generated first (i.e., before the negative charge); while in some other possible PFM switching cycle(s) the negative charge may be generated first (i.e., before the positive charge), as long as (the magnitude of) the negative charge is smaller than or (at most) equal to (the magnitude of) the positive charge, thereby ensuring that the total net charge transfer to the output during a PFM switching cycle is reduced. As will be discussed in more detail below, in some possible implementations, the extent to which the net charge is reduced may be controlled (e.g., adaptively or continuously) in accordance with the change of the load current.

Configured as proposed above, broadly speaking, the present disclosure generally provides a technique/mechanism of operating a power converter (e.g., a digital buck converter) with improved efficiency especially at low load, particularly in cases when the PFM frequency has to be (e.g., artificially) enabled to be maintained above a (predetermined or predefined) minimum/threshold. In general, this is considered achievable by the reduction in the charge Q per PFM cycle, using both a positive and negative contributor to the total as proposed herein. This has the effect of reducing the value of $I_{LOAD}$ that can be supported whilst meeting the minimum PFM frequency requirement.

In some embodiments, the power converter may further comprise a high side switching device and a low side switching device. The high side and low side switching devices may each be implemented in any suitable form, such as a transistor (e.g., a MOSFET) or the like. The high side switching device and the low side switching device may be coupled (in series) between an input node and a reference node (e.g., GND or any other suitable reference point/node) of the power converter. In particular, the inductor may be coupled between the output node and an intermediate node that is arranged between the high side switching device and the low side switching device. Accordingly, the method may further comprise, during the positive charge phase, switching the high side switching device to an ON state (e.g., a conducting state) for a first time period (before the high side switching device is switched off (to an OFF state)) such that a positive charge current across the inductor (in the direction from the input/supply to the output/load) is generated, thereby charging the inductor. Subsequently, the power converter may be configured to (during the positive charge phase) switch the low side switching device to the ON state for a second time period (before the low side switching device is switched off) for discharging the inductor to zero current (across the inductor). Moreover, the power converter may be further configured to, during the negative charge phase, switch the low side switching device to the ON state for a third time period, thereby generating a negative charge current across the inductor (or in other words, the current flows in the direction from the output/load to the input/supply). In that case, it may also be considered that the charge/energy is transferred from the load to the supply, as can be understood and appreciated by the skilled person. Notably, in some possible implementations where the third time period is immediately after the second time period (e.g., the positive charge phase is before the negative charge phase), it may also be seen that the second time period is extended for the third time period, such that the inductor is first discharged to zero current and subsequently continued to be charged but in the reverse (negative) direction. Subsequently, the power converter may be configured to further (during the negative charge phase) switch the high side switching device to the ON state for a fourth time period, thereby discharging the inductor until zero current across the inductor is reached again. As noted above, the positive charge phase and the negative charge phase may be implemented in either sequence. As a result, although the complete one PFM switching cycle may be understood to comprise the first through fourth time periods, the actual sequence of those time periods may differ, depending on various implementations and/or requirements.

In some embodiments, the method may comprise: setting the fourth time period as a first fixed ratio (e.g., less than 1) of the first time period; and determining the third time period based on the fourth time period. Configured as proposed, it may be guaranteed that the negative charge phase is less than the positive charge phase, which always gives a net positive charge contribution to the output. In some possible cases, a static active load (albeit at a much lower current) may still be considered necessary, for example in order to satisfy the minimum PFM frequency at some point.

In some embodiments, the method may comprise: determining a peak negative current during the third and fourth time periods (or more precisely, at the end of the third time period or at the beginning of the fourth time period) based on the fourth time period (which has been set to a fixed ratio of the first time period). Subsequently, the third time period may be determined based on the determined peak negative current.

In some possible embodiments, setting the fourth time period as the first fixed ratio of the first time period may not be sufficient for maintaining the PFM frequency above the predetermined frequency threshold (e.g., when the load current further drops in some possible cases). In such cases, the method may further comprise setting the fourth time period as a second fixed ratio (e.g., less than 1) of the first time period larger than the first fixed ratio. Broadly speaking, by setting the fourth time period to be a larger ratio of the first time period, it generally means that more negative charge would be generated and effectively less/smaller total net charge would be transferred to the output during one PFM switching cycle. Consequently, as can be deducted from equation (1), the PFM frequency could be correspondingly increased (by reducing the total charge Q), thereby being able to be maintained above the PFM frequency threshold. Notably, in some possible implementations, in order to allow the power converter (or the overall system) to switch back as the load current may increase (so increasing the PFM cycle rate), a (predetermined or predefined) hysteretic (frequency) threshold may be used. This hysteretic transition would generally be able to eliminate mode switch jitter for example in cases where the load current may sit at the transition point.

In some possible embodiments, the method may comprise determining (e.g., adjusting) a peak negative current during the third and fourth time periods based on the PFM frequency, and determining the third and fourth time periods based on the adjusted peak negative current. For instance, in some possible implementations, the (operational) PFM frequency may be measured or monitored (e.g., periodically) by using any suitable means, such that the peak negative current may be continuously (e.g., periodically) adjusted in accordance with the changing PFM frequency. Configured as proposed, a continuous adjustment of the charge delivered to the output may be implemented, for example using a variable peak negative current value. This technique may generally allow the minimum of the PFM frequency requirement to be satisfied even down to zero load current without the need for a static active load.

In some possible embodiments, the adjustment of the peak negative current may involve increasing the peak negative current for maintaining the PFM frequency above the predetermined frequency threshold. Additionally or alternatively, the adjustment of the peak negative current may involve decreasing the peak negative current when the PFM frequency is above a predetermined hysteresis frequency threshold. As illustrated above, in some possible implementations, this hysteresis frequency threshold may be needed in order to correctly switch modes of operation as the load current might change. Further, the adjustment (increasing and/or decreasing) may be implemented by using any suitable means. For instance, in some possible examples, such incremental or decremental may be implemented as simply as a corresponding $+/-\Delta$ (fixed or variable) step function. In some other possible examples, more complex functions may also be implemented, e.g., in accordance with the difference between the measured and target PFM frequencies.

According to a further aspect of the present invention, a computer program is provided. The computer program may include instructions that, when executed by a processor, cause the processor to carry out all steps of the example methods described throughout the present disclosure.

According to yet a further aspect of the present invention, a computer-readable storage medium is provided. The computer-readable storage medium may store the aforementioned computer program.

Details of the disclosed method can be implemented as systems (e.g., in the form of circuitry) adapted to execute some or all of the steps of the method, and vice versa, as the skilled person will appreciate. In particular, it is understood that methods according to the disclosure relate to methods of operating the power converter (or more generally, the circuitry) according to the above embodiments and variations thereof and that respective statements made with regard to the power converter (or circuitry) likewise apply to the corresponding methods, and vice versa.

It is also understood that in the present document, the term "couple" or "coupled" refers to elements being in electrical communication with each other, whether directly connected e.g., via wires or in some other manner (e.g., indirectly). Notably, one example of being coupled is being connected.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of a possible implementation of a power converter circuit, FIG. 2 schematically illustrates an example of a PFM cycle of the power converter circuit of FIG. 1.

DETAILED DESCRIPTION

As indicated above, identical or like reference numbers in the present disclosure may, unless indicated otherwise, indicate identical or like elements, such that repeated description thereof may be omitted for reasons of conciseness.

Broadly speaking, when power converters (e.g., buck converters or the like) have light loading, a commonly adopted operation is to implement a so-called discontinuous conduction scheme, which is often referred to as a pulse frequency modulation (PFM) mode. In some possible implementations, a simple comparator (or the like) may be used to determine whether the output voltage (VOUT) is below a target value (e.g., predetermined or predefined), and correspondingly generate a single switching cycle if the answer is positive.

Figure 1:
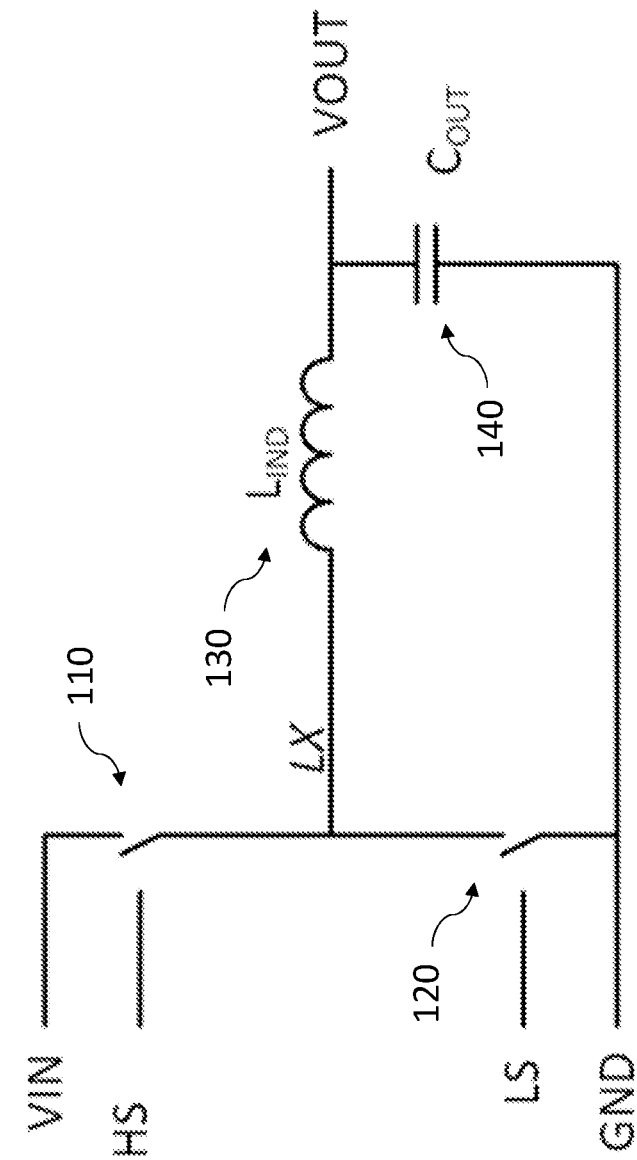

FIG. 1 schematically illustrates an example of a possible implementation of a power converter circuit 100. Although a buck converter (e.g., a buck DC-DC converter) may have been illustratively shown in FIG. 1, it should nevertheless be understood that such a buck converter implementation is merely shown as an illustrative example, but certainly not as a limitation of any kind. That is to say, as will also be understood and appreciated by the skilled person, the techniques/mechanisms proposed in the present disclosure may be applied to any suitable power converter implementation as well, which may include but is certainly not limited thereto, boost converters, buck-boost converters, or the like (with suitable adaptation or modification, if considered necessary and appropriate).

As shown in the example of FIG. 1, the (buck) power converter 100 may comprise a high side (HS) switching device/element (e.g., a transistor, a MOSFET, or the like) 110 and a low side (LS) switching device/element (e.g., a transistor, a MOSFET, or the like) 120 that are coupled (in series) between the input (denoted as VIN) and a reference node (denoted as GND). The buck converter 100 may also comprise an inductor 130 (denoted as $L_{IND}$) between an intermediate node (denoted as LX) that is arranged between the high side switch 110 and the low side switch 120, and the output node (denoted as VOUT). In some possible implementations, the buck converter 100 may also comprise a capacitor 140 (denoted as $C_{OUT}$) coupled between the output VOUT and the reference node GND.

Figure 2:
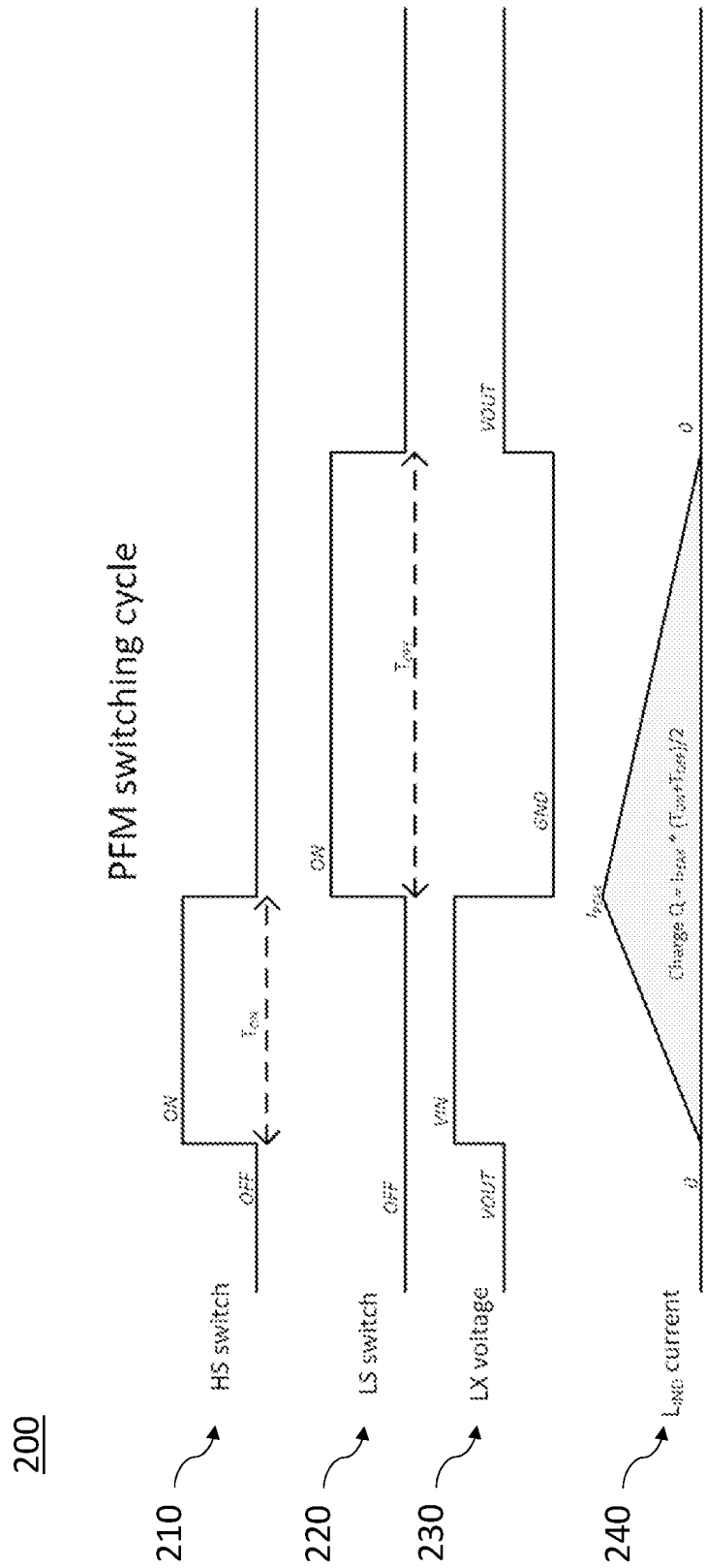

FIG. 2 schematically illustrates an example of a (typical) PFM cycle 200 of the power converter circuit 100 as shown in FIG. 1. In particular, the PFM cycle 200 may consist of a high side switch pulse/phase (as shown in diagram 210) to charge the inductor from 0 to a (positive) peak current (hereinafter denoted as $I_{PEAK}$), followed by a low-side switch pulse/phase (as shown in diagram 220) to discharge the inductor back to 0 current. As can be understood and appreciated by the skilled person, the 'on' time (i.e., the time period during which the HS switch 110 is in the ON/conducting state, denoted as $T_{ON}$ in diagram 210) and the 'off' time (i.e., the time period during which the LS switch 120 is in the ON/conducting state, denoted as $T_{off}$ in diagram 220) may generally be dependent on the input (VIN) and output (VOUT) voltages. In some possible cases, the $T_{on}$ and $T_{off}$ times may also be simply referred to as the first and second times or time periods, respectively.

Particularly, in each switching cycle, it may be considered that a fixed amount of charge Q may be transferred (from the input or power supply) to the output. The total charge Q may be calculated for example according to:

$$Q = I_{PEAK} \times (T_{ON} + T_{OFF})/2. \tag{2}$$

Such charge transfer would generally result in a periodic repetition of switching cycles of the PFM operation for a given load. The fixed repetition frequency $PFM_{FREQ}$ may be determined (e.g., calculated) according to the above-illustrated equation (1). According to such equation, the PFM frequency (or in some possible cases, the rate of PFM cycles per second) may be understood to be proportional to the load current as exemplarily shown in FIG. 4.

In some possible applications, the PFM frequency may be considered interference to the system being powered. For example, in some possible audio systems, a frequency of <20 KHz may produce tones that could be heard (audible or perceivable). As another example, in some possible touchscreen applications, sensor interference may affect the scanning and detection operations. Therefore, in order to prevent the PFM switching from causing interference in such possible applications, a minimum (operational) PFM frequency may have to be specified.

In order to keep the PFM frequency above a predefined limit, one possible solution may be to measure the PFM cycle period, and if this drops below a predefined level, an additional static (or variable) load may be added to the output, in order to guarantee that the minimum frequency is met for all load currents below this level.

Figure 3:
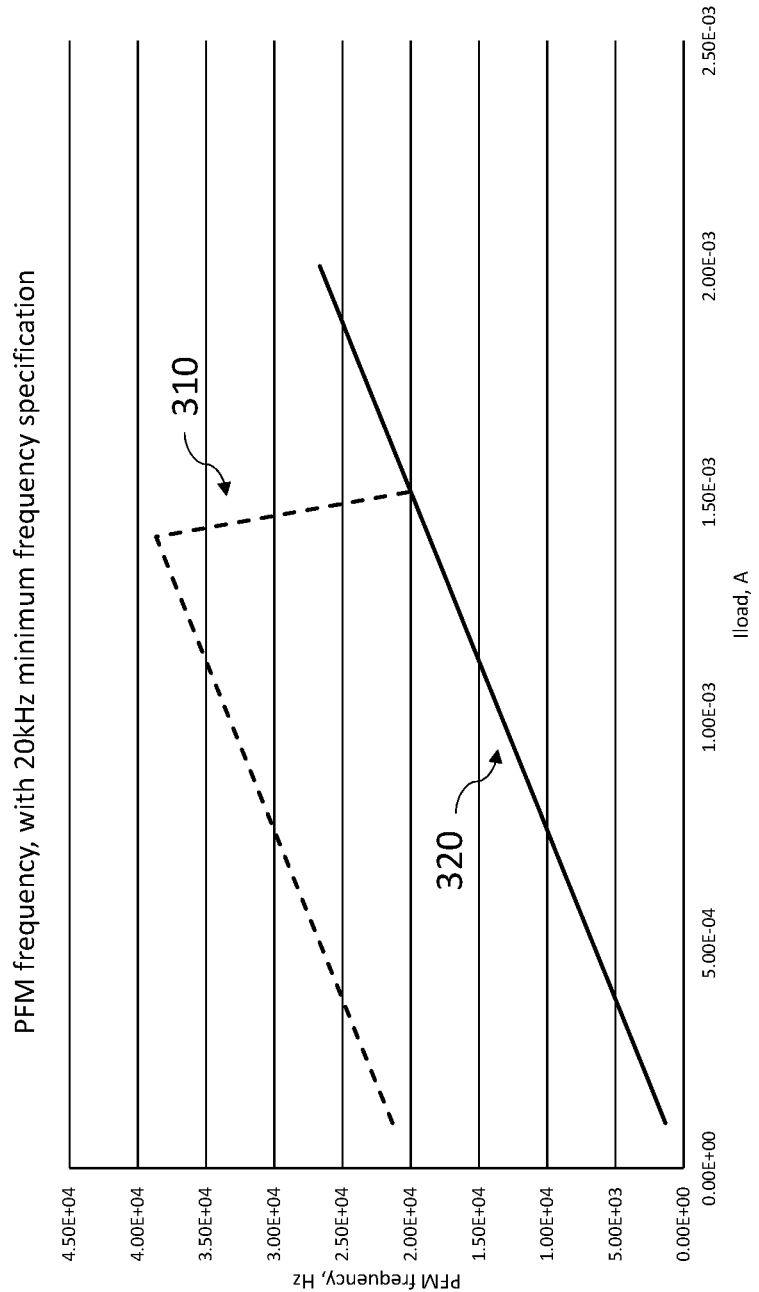
FIG. 3 is a diagram schematically illustrating a comparison between the PFM frequencies of implementations with or without an additional load.

FIG. 3 schematically shows the effect of adding a (static) additional load to achieve a minimum PFM frequency (as shown in diagram 310 indicated by the dashed line), where the x-axis schematically represents the load current (denoted as $I_{load}$, in the unit of A) whereas the y-axis schematically represents the PFM frequency (in the unit of Hz). On the other hand, diagram 320 (in solid line) schematically shows an example of the PFM frequency versus load current if no additional load is added. In particular, diagram 310 has the additional load added when the output load drops below ≈1.6 mA, thereby being able to maintain a minimum 20 kHz value for the PFM frequency.

However, as has already been mentioned earlier, one of the major downsides of such a solution is that the system efficiency, particularly when this additional load current is applied, would drop significantly. Some potential considerations for possibly helping reduce the static load may involve for example measuring the PFM frequency and adaptively changing the value of the applied static load to maintain a constant frequency as the load current $I_{LOAD}$ is reduced, or decreasing the $I_{PEAK}$ value thereby reducing the charge per PFM cycle. However, there may typically be concerns or issues related to for example a 'sweet spot' for maximum analog circuitry efficiency, as well as minimum $T_{ON}$ and $T_{OFF}$ times to be maintained.

Figure 5:
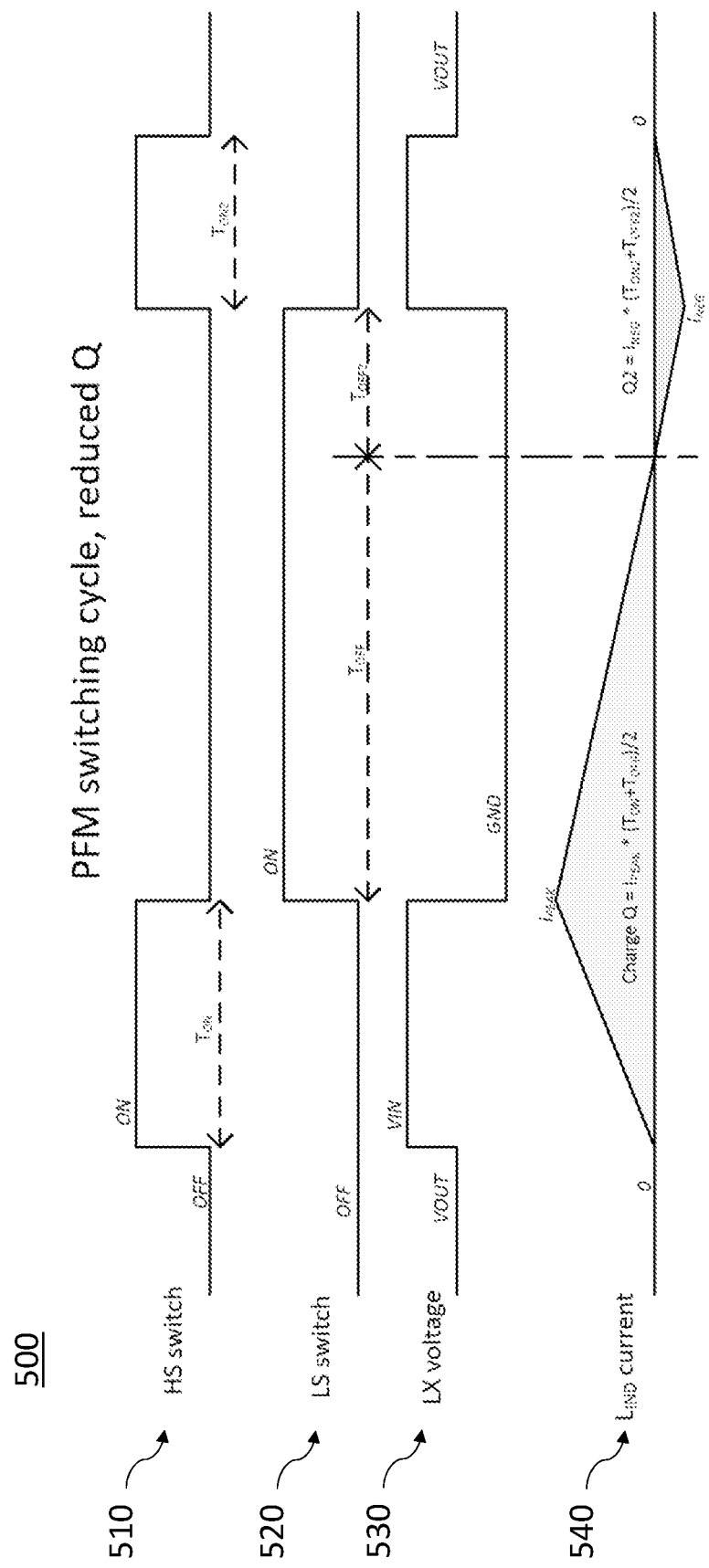

In view thereof, in a broad sense, the present disclosure generally proposes implementations of power converters configured with PFM, and techniques and/or mechanisms for the efficient operation of such power converters, particularly at low load conditions. Broadly speaking, this is achieved by reducing the (effective net) charge Q per PFM cycle to maintain a minimum repetition PFM frequency as the load current decreases, by alteration of the pulse shape. In some possible implementations, the altered pulse shape of the PFM cycle may consist of an HS switching phase for a period $T_{ON}$, an LS switching phase for a period of $T_{OFF}$ long enough so as to take the inductor current negative, followed by a further HS switching phase for a time period of $T_{ON2}$ to discharge the inductor, as will be discussed in more detail below with reference to FIG. 5. It is nevertheless to be noted that, as has been mentioned earlier, the sequence of the HS and LS switching phases may be inverted in some possible implementations. That is to say, in some cases, it may be possible to start first with an LS switching phase $T_{OFF}$, followed by an HS switching phase $T_{ON}$ (that is long enough to take the inductor current to positive), and finally a further LS switching phase $T_{OFF2}$ to discharge the inductor back to zero current, thereby achieving an analogous or similar effect to that as shown in FIG. 5. It may also be worth mentioning that, in some possible implementations, in order to ensure a proper operation of the power converter, in some possible implementations, the three switch times, i.e., $T_{ON}$, $T_{OFF}$ and $T_{ON2}$, each may have to satisfy the respective $T_{ON\_MIN}$ and $T_{OFF\_MIN}$ times, as can also be understood and appreciated by the skilled person.

As mentioned above, example embodiments of the present disclosure may appear to be illustratively described with reference to a buck converter (or more specifically, a digitally controlled buck converter). However, such a buck converter should not be understood as a limitation of any kind. The concept as described herein may be applicable to other suitable power converter implementations as well (possibly with suitable adaptation or modification if necessary).

Generally speaking, the operation of the digital buck may typically be done using a high-frequency clock (e.g., an oscillator) or the like to time the HS and LS switching periods. In addition, the HS and LS switching times may be determined or calculated using the measured VIN and VOUT voltages (typically accomplished using an ADC).

For a 'normal'/typical PFM cycle as illustratively shown in FIG. 2, the following equations (3) and (4) may be used to determine the $T_{ON}$ and $T_{OFF}$ times:

$$T_{ON} = \frac{I_{PEAK} \times L_{IND}}{(VIN - VOUT)} \quad (3)$$

and $$T_{OFF} = \frac{I_{PEAK} \times L_{IND}}{VOUT}, \quad (4)$$

where $L_{IND}$ generally denotes the inductor value, $I_{PEAK}$ generally denotes the target peak current of the PFM cycle, VIN generally denotes the buck supply voltage, and VOUT generally denotes the buck output voltage.

If either $T_{ON}$ or $T_{OFF}$ is below their respective $T_{ON\_MIN}$ and $T_{OFF\_MIN}$ minimum times, the $I_{PEAK}$ value may be increased to achieve this requirement. Conversely, the $I_{PEAK}$ value to satisfy the minimum $T_{ON}$ and $T_{OFF}$ times may be calculated. Notably, as can also be understood and appreciated by the skilled person, the $T_{ON\_MIN}$ and $T_{OFF\_MIN}$ requirements may generally imply a minimum charge Q delivered in each PFM cycle. Further, as indicated earlier, the PFM cycle may be triggered by the VOUT voltage dropping below the target (e.g., predetermined) threshold voltage.

To give an illustrative example for ease of understanding (but certainly not as a limitation of any kind), assuming that the following values are used:

| | | | |
|---|---|---|---|
| VIN = 4.5 V | VOUT = 1.8 V | $I_{PEAK}$ = 600 mA | $L_{IND}$ = 470 µH |

Then it may be calculated, for example, based on the above equations (3) and (4), that $T_{ON}$ = 104 ns, and $T_{OFF}$ = 157 ns.

Notably, in this illustrative example, it is generally assumed that both values of $T_{ON}$ and $T_{OFF}$ are above their respective minimum times (i.e., $T_{ON\_MIN}$ and $T_{OFF\_MIN}$).

The above-determined $T_{ON}$ and $T_{OFF}$ values would then further result in the charge Q per PFM cycle to be calculated (for example based on equation (2)) as:

$$Q = 78.3 \ nC.$$

Figure 4:
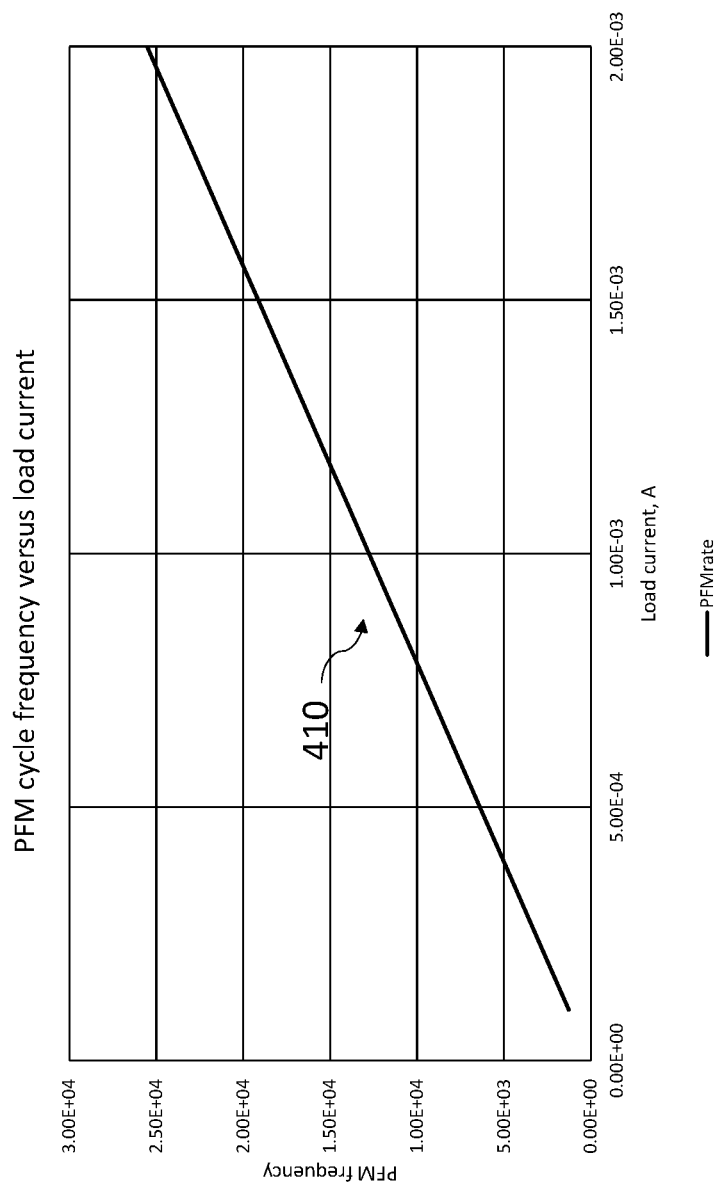
FIG. 4 is a diagram schematically illustrating PFM cycle frequencies versus load currents, FIG. 5 schematically illustrates an example of a PFM cycle of the power converter circuit of FIG. 1 according to embodiments of the present disclosure.

Accordingly, for a range of load currents, graph 410 may be obtained as schematically shown in FIG. 4. Therein, it may be observed that, in order to maintain a minimum PFM frequency of 20 kHz, a corresponding minimum load current of ~1.57 mA might be needed.

In order to be able to reduce the total charge Q per PFM cycle, in some possible implementations, the HS and LS switching may be modified for example to cause the inductor current to go negative, thereby reducing the (effective net) charge transferred to the load. This general concept is schematically shown in FIG. 5. As indicated earlier, identical or like reference numbers in FIG. 5 may, unless indicated otherwise, indicate identical or like elements in FIG. 2, such that repeated description thereof may be omitted for reasons of conciseness.

In particular, for the additional part of the PFM cycle 500 as shown in FIG. 5, to generate the negative charge region the following equations (5) and (6) may be used:

$$T_{ON2} = \frac{I_{NEG} \times L_{IND}}{(VIN - VOUT)} \tag{5}$$

and $$T_{OFF2} = \frac{I_{NEG} \times L_{IND}}{VOUT}. \tag{6}$$

In some possible cases, the $T_{ON2}$ and $T_{OFF2}$ times may also be simply referred to as a fourth time period and a third time period, respectively (in order to be distinguished from the $T_{ON2}$/first time period and $T_{OFF}$/second time period during the 'normal'/typical PFM switching cycle as illustrated above).

It may also be worthwhile mentioning that, in some possible digital buck implementations, the results of the calculations for $T_{ON2}$ and $T_{OFF2}$ may be quantized. The quantization could be realized in a number of suitable ways. For instance, this may include, but is certainly not limited thereto, simple rounding, having dither added, using a delta-sigma approach, or the like. Particularly, the latter two possible examples might reduce any quantization limit cycle for example by randomizing the quantization error.

Similar to above equation (2), the negative charge Q2 generated during the negative charging phase (including both the $T_{ON2}$ and $T_{OFF2}$ times) may be calculated as:

$$Q2 = I_{NEG} \times (T_{ON2} + T_{OFF2})/2, \tag{7}$$

where $I_{NEG}$ generally denotes the peak negative current during the negative charging phase.

Accordingly, the (effective) total net charge may then be calculated as:

$$Q_{Total} = Q - Q2, \tag{8}$$

which, as illustrated above, may generally provide the effect of increasing the PFM cycle frequency for a given load current.

The negative charge region may be generated by using any suitable means, as can be understood and appreciated by the skilled person. Now, two of those possible techniques/mechanisms for controlling the generation of the negative charge will be illustratively described in more detail below, with reference to FIGS. 6 to 9.

Generally speaking, the first possible controlling mechanism may involve making the $T_{ON2}$ period a fixed ratio of the $T_{ON}$ period, and correspondingly calculating the required $I_{NEG}$ and $T_{OFF2}$. This first method may be considered to be able to guarantee that the negative charge phase is less than the positive charge phase, thereby always giving a net positive charge contribution to the output. However, at least in some possible implementations, this method may still require a static (or variable) active load (albeit at a much lower current compared to conventional techniques) in order to satisfy the minimum PFM frequency (denoted as $PFM_{FREQ\_MIN}$) requirement.

For ease of understanding, the following example illustrative shows the PFM cycle frequency for two possible fixed ratios of $T_{ON2}$ to $T_{ON}$. In some possible implementations, these may be chosen as 75% (or ¾) and 87.5% (or ⅞), both of which may be considered easy to calculate/implement (particularly in the field of digital circuits, e.g., may be achievable by using shift-add). For example:

$$T_{ON\_75\%} = T_{ON} - T_{ON}/4, \text{ and}$$

$$T_{ON\_87.5\%} = T_{ON} - T_{ON}/8.$$

For a $T_{ON2}$ equal to 75% of $T_{ON}$, it may be generally calculated that approximately 44% of the charge could be transferred to the output, while for a $T_{ON2}$ equal to 87.5% of $T_{ON}$, approximately 24% of the charge may be transferred to the output.

Similar to above, assuming that the following values are used:

| VIN = | VOUT = | $I_{PEAK}$ = | $L_{IND}$ = | $T_{ON\_MIN}$ = |
|---|---|---|---|---|
| 4.5 V | 1.8 V | 600 mA | 470 µH | 25 ns |

Figure 6:
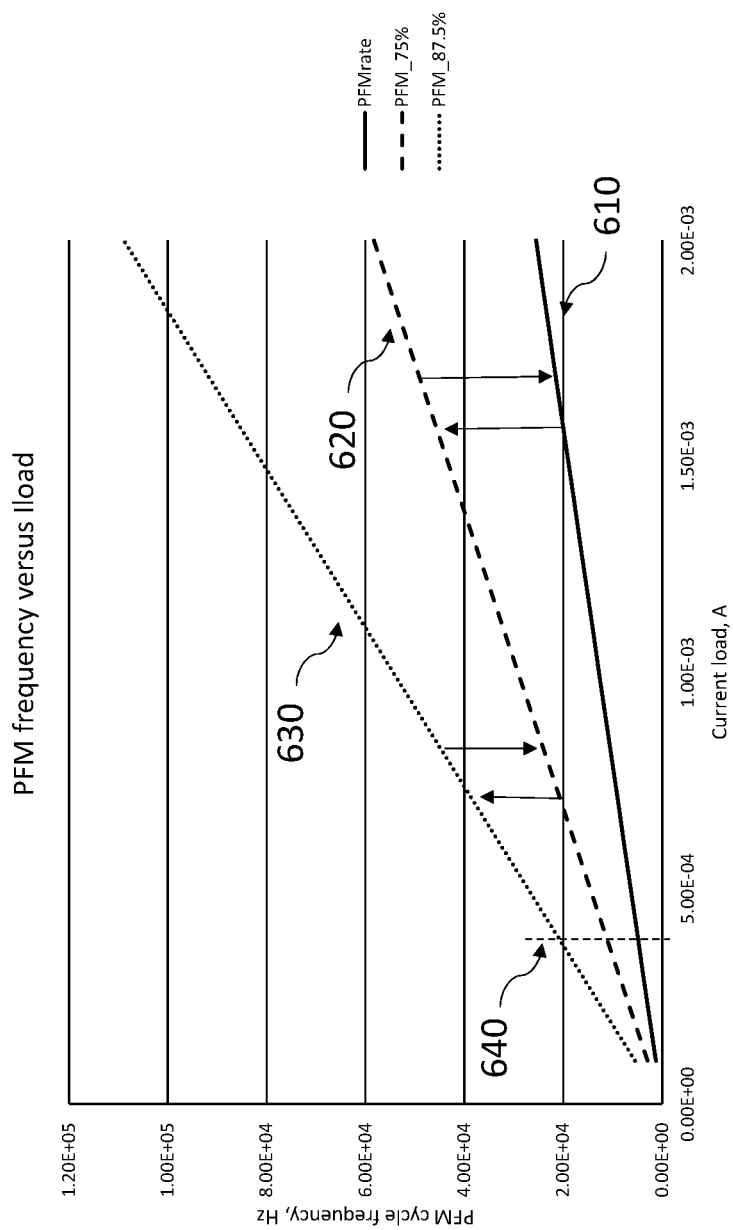
FIG. 6 is a diagram schematically illustrating a comparison between the PFM frequencies versus various load currents according to embodiments of the present disclosure.

By specifying the range of $V_{IN}$ and $V_{OUT}$ that can be accommodated, with the $I_{PEAK}$ and inductor value, the $T_{ON\_MIN}$ requirement may be achieved for both $T_{ON}$ and $T_{ON2}$ times without any additional calculations. As a result, the following diagrams 610 (solid line), 620 (dashed line), and 630 (dotted line) may be generated, as schematically shown in FIG. 6. Therein, graph 610 may be understood to generally correspond to graph 410 as shown in the above-illustrated FIG. 4 (i.e., the 'normal'/typical operation).

Specifically, as can be seen from FIG. 6, in order to maintain a $PFM_{FREQ\_MIN}=20$ KHz, the additional static load may (substantially) drop from ~1.57 mA to ~685 µA at 75%, and further down to ~367 µA at 87.5% (as indicated by the dashed line 640).

Figure 7:
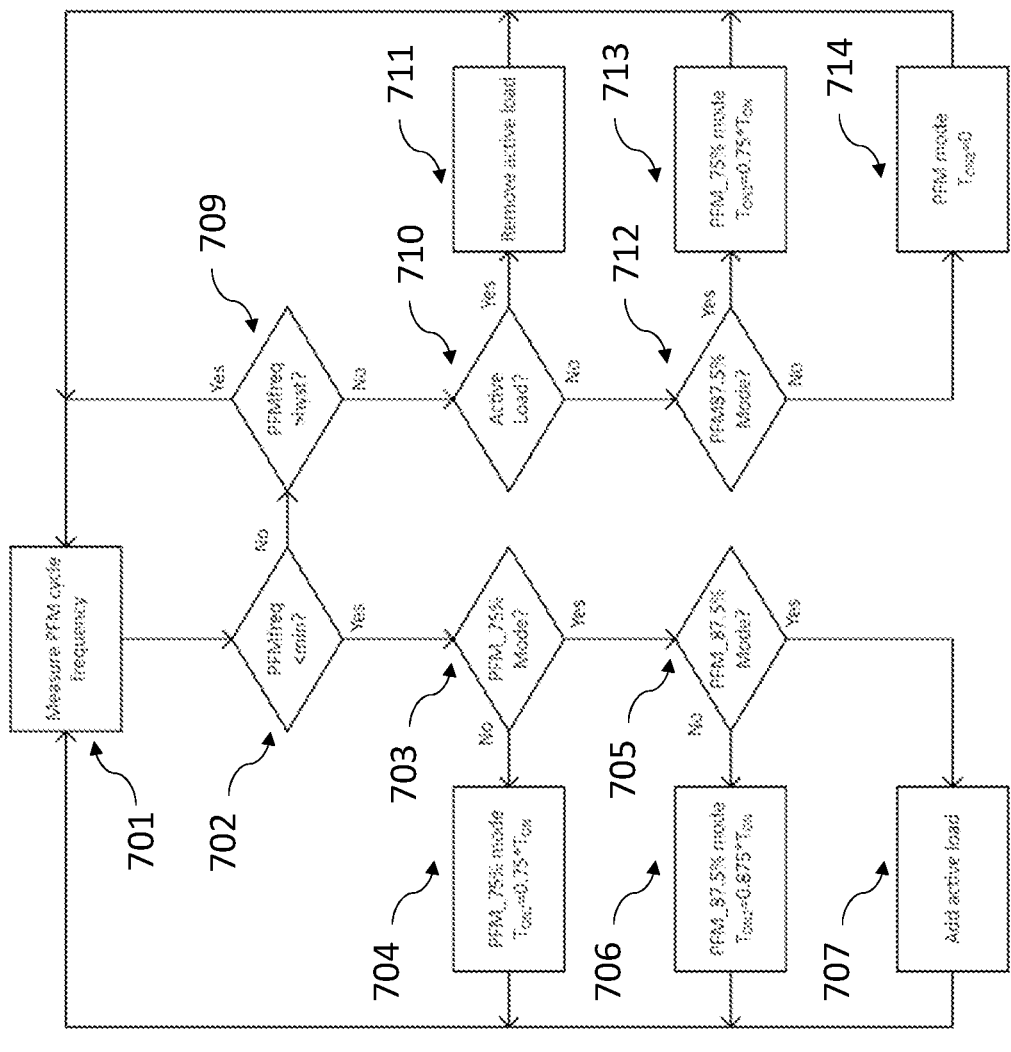
FIG. 7 is a flow diagram schematically illustrating an example of a mechanism for determining or controlling the PFM cycle operation according to embodiments of the present disclosure.

FIG. 7 schematically illustrates, in the form of a flow diagram 700, a possible algorithm for determining the PFM cycle operation which implements the above-illustrated first method/mechanism. This algorithm may be carried out by any suitable means (e.g., a component) of the power converter or of the whole circuit/system. A possible (non-limiting) example for such a component may be a controller (or a controlling component/element).

First, the proposed algorithm may measure (e.g., by using any suitable means, not shown in the figures) the PFM cycle frequency (block 701), and if (block 702) the measured PFM frequency exceeds a (e.g., predetermined) minimum threshold (e.g., 20 KHz or the like), the $T_{ON\_75\%}$ configuration is enabled (block 704, also schematically indicated by the upwards arrow from diagram 610 to diagram 620 in FIG. 6). Subsequently, if (block 705) the minimum frequency threshold (or the other way round, the maximum period threshold) is crossed again as the load current reduces, the $T_{ON\_87.5\%}$ is enabled (block 706, also schematically indicated by the upwards arrow from diagram 620 to diagram 630 in FIG. 6). As illustrated above, in some possible cases, an additional (active) load may still have to be added (block 707) to avoid the PFM frequency from dropping below the minimum frequency threshold as the load current continues to decrease.

On the other hand, in order to allow the system to possibly switch back as the load current (e.g., gradually) increases (thereby increasing the PFM cycle frequency), a hysteretic/hysteresis threshold may be used. This is indicated by the transition (downwards) arrows on the diagrams of FIG. 6. Notably, the corresponding procedure (blocks 709 to 714) may generally be considered as a reverse of the procedure illustrated above with reference to blocks 702 to 707, and is thus not reiterated here in detail for the sake of conciseness, as can be understood and appreciated by the skilled person. Configured as proposed, such hysteretic transition may be considered to help eliminate the mode switch jitter as the load current sits at (or around) the transition point.

Furthermore, an alternative second approach may be proposed to generally adjust the $I_{NEG}$ value and then calculate the $T_{ON2}$ and the additional $T_{OFF2}$ times based thereon. Similar to the above-illustrated first approach, the additional part of the PFM cycle may be enabled when the PFM cycle frequency crosses the minimum requirement.

Notably, as can also be understood and appreciated by the skilled person, an additional possible requirement may be that, in some possible implementations, there might exist an $I_{NEG\_MIN}$ value in order to satisfy the $T_{ON\_MIN}$ requirement. Such $I_{NEG\_MIN}$ value may be calculated according to the below equation (9):

$$I_{NEG\_MIN} = \frac{T_{ON\_MIN} \times (V_{IN} - V_{OUT})}{L_{IND}}. \quad (9)$$

Figure 8:
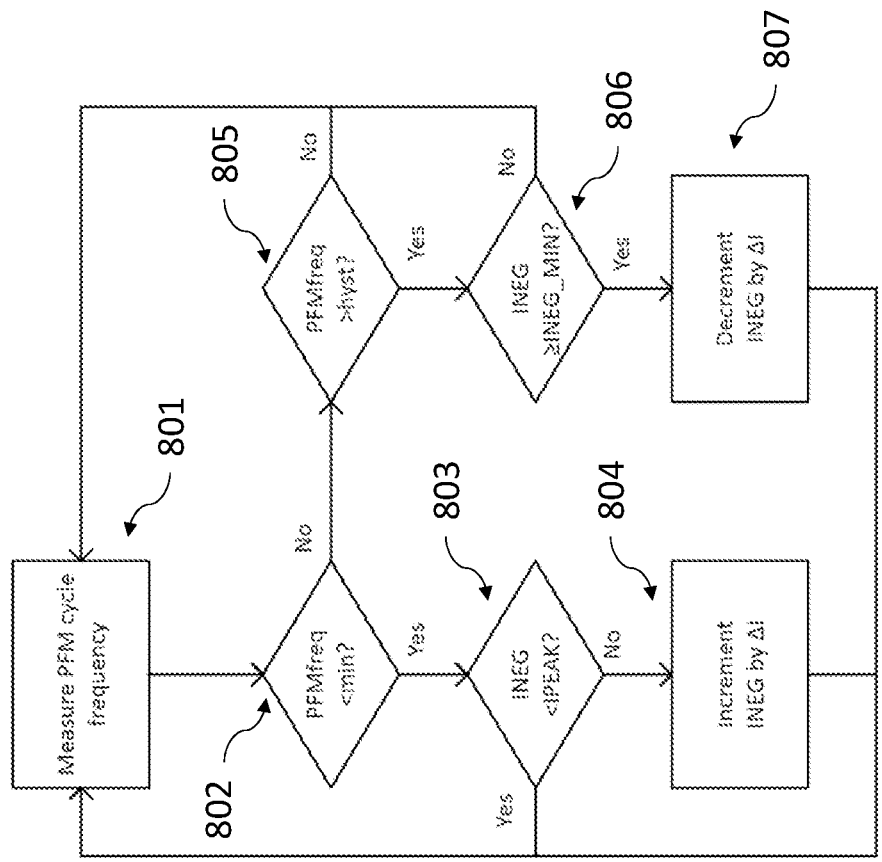
FIG. 8 is a flow diagram schematically illustrating another example of a mechanism for determining or controlling the PFM cycle operation according to embodiments of the present disclosure.

In a broad sense, as can be seen from the illustrative diagram 800 of FIG. 8, this proposed algorithm (similar to diagram 700 as shown in FIG. 7) may be considered to comprise measuring the PFM cycle frequency (block 801). If (block 802) the measured PFM frequency is below the $PFM_{FREQ\_MIN}$ threshold, the additional (negative charge) part of the PFM cycle may be added with $I_{NEG} \geq I_{NEG\_MIN}$ (block 804). The PFM cycle frequency (or period) may be continuously or periodically measured, such that the $I_{NEG}$ may also be continuously increased (if deemed necessary) until it reaches $I_{PEAK}$ (block 803) to maintain the PFM cycle frequency minimum as the load current decreases. On the other hand, if the PFM cycle frequency exceeds the hysteresis threshold (block 805), the $I_{NEG}$ may be decremented (block 807) until it reaches the $I_{NEG\_MIN}$ (block 806) as the load current increases. One of the main possible reasons may be that, as mentioned earlier, the requirement of a minimum $I_{NEG}$ current may in some cases lead to an increase in PFM cycle frequency, particularly at the mode transition. As a result, this would generally necessitate a hysteresis in the PFM cycle period count to correctly switch modes of operation as the load current changes. Summarizing the above, the algorithm as illustrated in flow diagram 800 of FIG. 8 generally changes the $I_{NEG}$ value depending on the measured PFM cycle frequency, in a range from $I_{NEG\_MIN}$ to $I_{PEAK}$.

It may be worth mentioning that the function used to increment and decrement the $I_{NEG}$ value may be a simple $+/-\Delta I$ step, for example as illustratively shown in blocks 804 and 807 of FIG. 8. However, as can be understood and appreciated by the skilled person, any other suitable function may be implemented as well, depending on various circumstances. For instance, it may be possible to implement a more complex function that is based on the difference between the measured and target PFM frequencies.

Notably, compared to the first approach as described with reference to FIGS. 6 and 7, one of the possible key advantages of this technique of (dynamically) adjusting $I_{NEG}$ may be that the load current may be reduced down to zero while maintaining the required PFM cycle period.

Again as an illustrative example, the following values are assumed (essentially the same as above):

| VIN = | VOUT = | $I_{PEAK}$ = | $L_{IND}$ = | $T_{ON\_MIN}$ = |
|---|---|---|---|---|
| 4.5 V | 1.8 V | 600 mA | 470 µH | 25 ns |

Then the minimum $I_{NEG}$ may be determined (for example according to equation (9)) as:

$$I_{NEG\_MIN} = 144 \text{ mA}.$$

Figure 9:
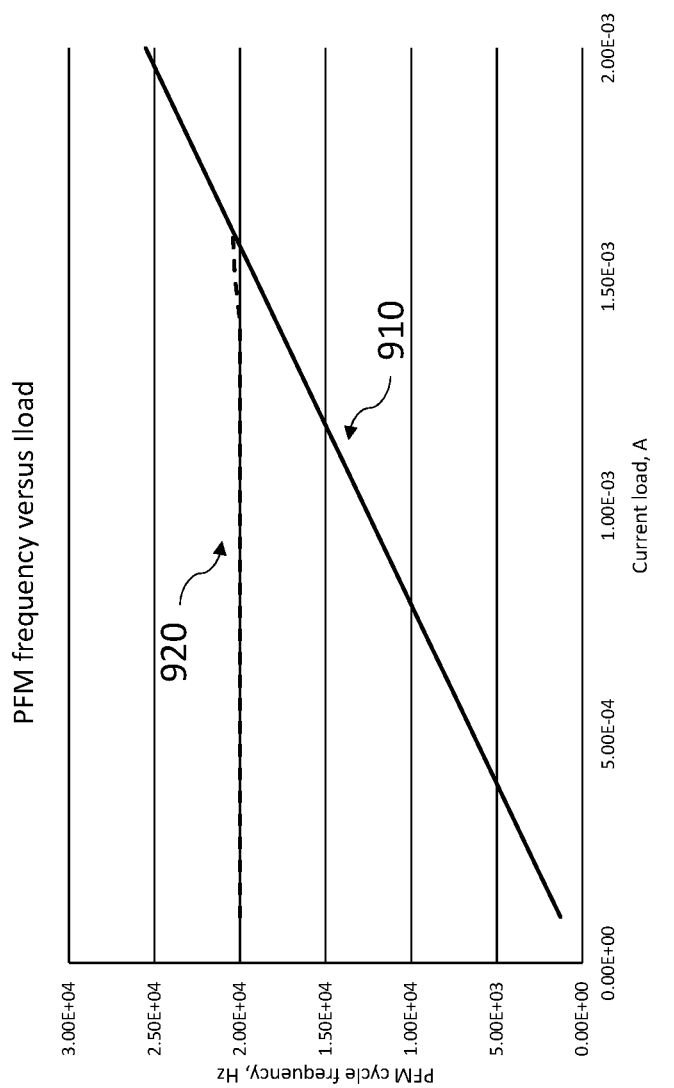
FIG. 9 is a diagram schematically illustrating another comparison between the PFM frequencies versus various load currents according to embodiments of the present disclosure.

Accordingly, similar to FIG. 6, the following results may be generated and schematically shown in FIG. 9. Therein, graph 910 may be understood to generally correspond to graph 610 as shown in the above-illustrated FIG. 6. Notably, graph 920 (dashed line) of FIG. 9 also illustratively shows a small increase in PFM frequency when it is just below the minimum required frequency, which is generally due to the $I_{NEG\_MIN}$ requirement.

As emphasized above, the generation of the negative charge may be implemented by using any other suitable means as well, as can be understood and appreciated by the skilled person. Moreover, the above proposed controlling/generation algorithms (or any other suitable mechanism) may be performed by any suitable element/component of the power converter (or more generally, of the whole circuity/system), such as a controller (not shown in the figures).

Figure 10:
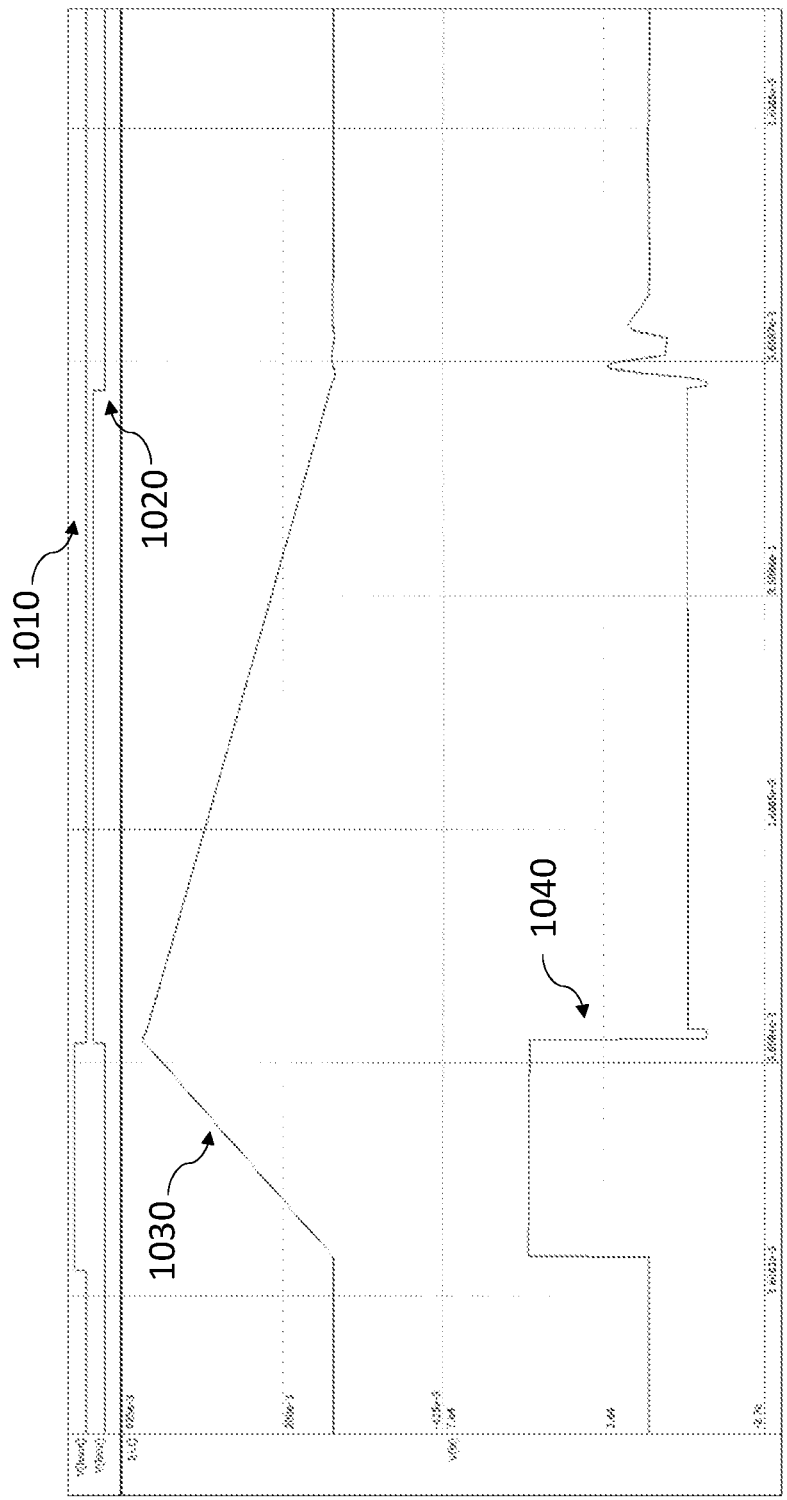
FIG. 10 is a diagram schematically illustrating an example of a simulation result of a typical PFM cycle.
Figure 11:
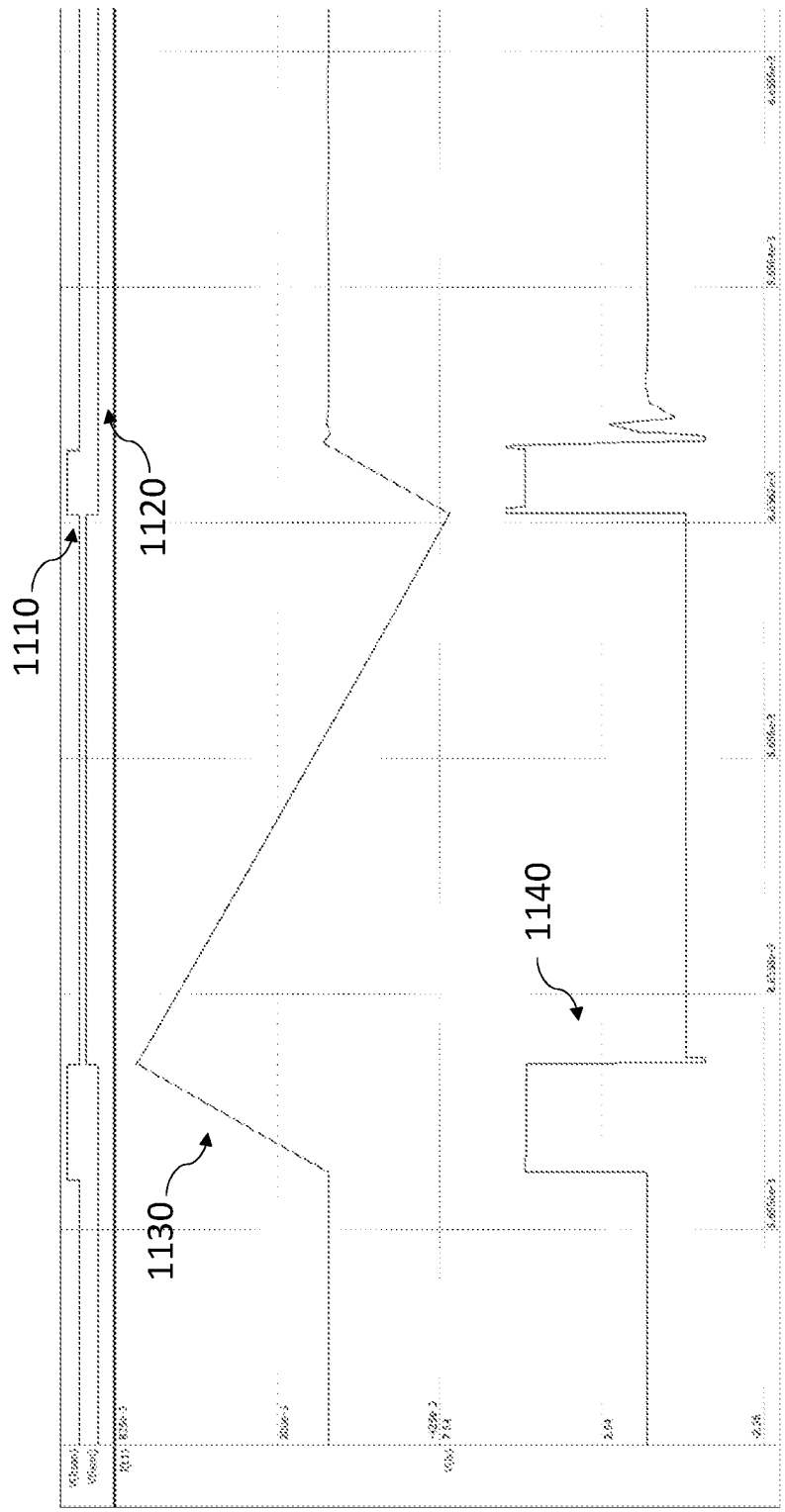
FIG. 11 is a diagram schematically illustrating another example of a simulation result of a PFM cycle according to embodiments of the present disclosure.

For the sake of completeness, FIGS. 10 and 11 further schematically illustrate example simulation results of a typical PFM cycle (FIG. 10) in comparison to a PFM cycle according to embodiments of the present disclosure (FIG. 11).

To be more specific, in the typical PFM pulse as shown in FIG. 10, the plots illustratively show the HS (diagram 1010) and LS (diagram 1020) switching periods, the inductor current (diagram 1030) and the LX voltage (diagram 1040). Therein, the inductor current schematically ramps to roughly 750 mA in ~92 ns and then back to zero in ~280 ns, which generally results in a charge of 377 mA$_{AVG}$ in 372 ns=140 nC being transferred to the output. Notably, as can also be understood by the skilled person, there appears to exhibit a little residual current which causes the ringing at the end of diagram 1040, which is generally considered a typical and expected behaviour.

On the other hand, FIG. 11 schematically shows the modified PFM pulse according to embodiments as proposed in the present disclosure, which (as can be seen from diagram 1130) generally has the same positive inductor current, but ramps to a negative value before returning to zero. As a result, the net charge transferred to the output is considered to be significantly lower. The current ramps to 750 mA in 92 ns, then down to −475 mA in 469 ns, and back to zero again in 53 ns, generally resulting in a charge of 134 mA$_{AVG}$ in 615 ns=82.4 nC being transferred to the output. A similar ringing is also observed in diagram 1140 as well.

To summarize the above, particularly by being configured as proposed above, the present disclosure generally provides an implementation of a power converter (e.g., a digital buck converter) with improved efficiency especially at low load, particularly in cases when the PFM frequency has to be (e.g., artificially) enabled to be maintained above a (predetermined or predefined) minimum/threshold. In general, this is considered achievable by the reduction in the charge Q per PFM cycle, using both a positive and negative contributor to the total as proposed herein. This has the effect of reducing the value of I$_{LOAD}$ that can be supported whilst meeting the minimum PFM frequency requirement.

Figure 12:
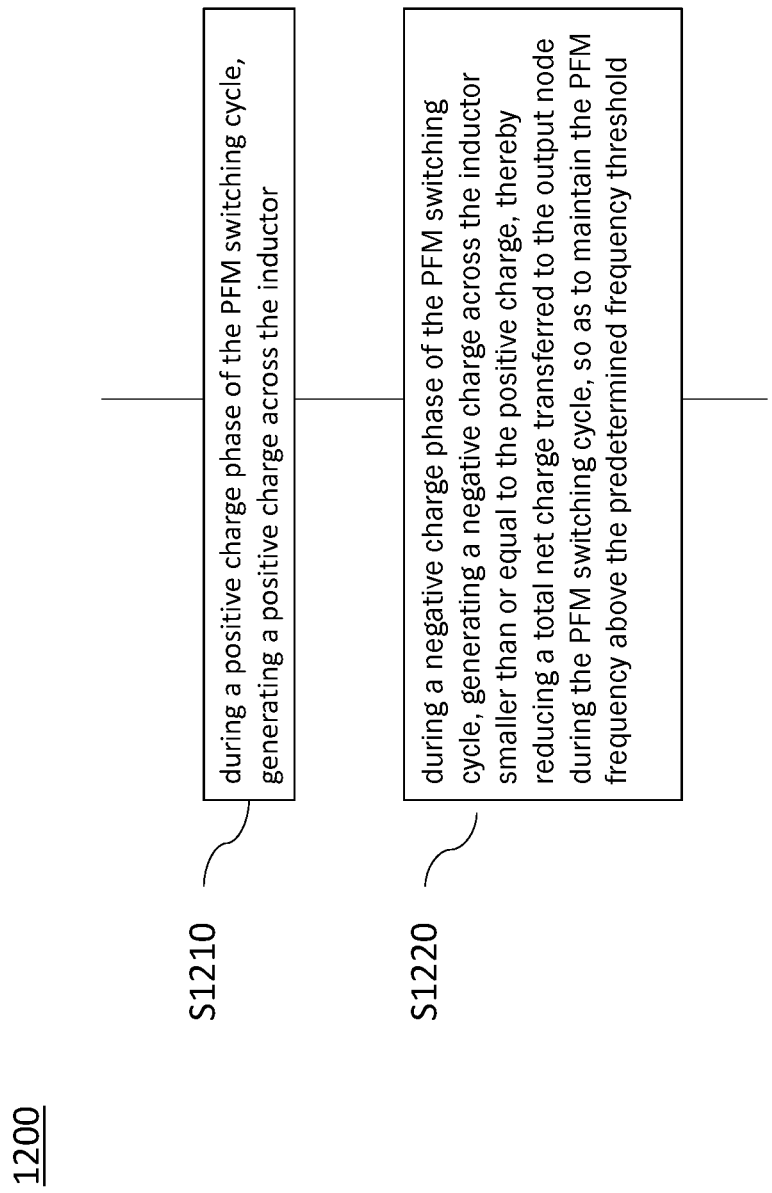

Finally, a flowchart illustrating an example of a method 1200 for operating such a power converter configured with PFM is schematically shown in FIG. 12. As illustrated above, the power converter may for example be a buck converter (e.g., a DC (direct current)-DC buck converter), a boost convert, or any other suitable power converter. Particularly, method 1200 may be configured for enabling maintaining of a PFM frequency of the power converter to be above a predetermined (or predefined, preconfigured, etc.) frequency threshold when a load current at an output node of the power converter decreases/drops. The power converter may comprise, among others, an inductor (or an inductive element implemented in any suitable form).

In particular, method 1200 may comprise, in a PFM switching cycle, at step S1210, particularly during a positive charge phase of the PFM switching cycle, generating a positive charge across the inductor. Depending on various implementations, such positive charge may for example be generated by a positive current flowing through the inductor in a (positive) direction from an input node (e.g., supply) of the power converter to the output node (e.g., load) of the power converter, or in any other suitable manner, as can be understood and appreciated by the skilled person. Method 1200 may further comprise, at step S1220, particularly during a negative charge phase of the PFM switching cycle, generating a negative charge across the inductor. Similar to the positive charge generation, such negative charge may be, depending on various implementations, generated by a negative current flowing through the inductor in a (reverse/negative) direction from the output node of the power converter to the input node of the power converter, or in any other suitable manner, as can also be understood and appreciated by the skilled person.

Specifically, the negative charge (or specifically, an (absolute) magnitude thereof) may be smaller than the positive charge (or specifically, an (absolute) magnitude thereof), such that a total net charge (which might be positive or zero, depending on the negative charge generated) that is transferred (from the supply/input node) to the output (load) node during the PFM switching cycle may be reduced (e.g., in comparison with cases where only a positive charge is generated but no negative charge, for example during normal operations when the PFM frequency is above the predetermined frequency threshold), so as to maintain the PFM frequency above the predetermined frequency threshold. Notably, it may be worth mentioning that, the negative charge phase may be, but does not necessarily always have to be, triggered or enabled for a particular PFM switching cycle. For instance, in some possible implementations, when the PFM frequency is above the predetermined frequency threshold, it may be possible that only the positive charge phase is implemented or enabled. On the other hand, in order to avoid the PFM frequency from dropping below the predetermined frequency threshold (e.g., due to the decrease of the load current), the negative charge phase may be triggered or enabled in order to reduce the total net charge transferred during the PFM switching cycle as illustrated above, thereby maintaining the PFM frequency to be above a predetermined frequency threshold even when the load current drops (e.g., in low load conditions).

It may be further worth mentioning that, within a specific PFM switching cycle, the positive charge phase may be, but does not necessarily have to be, before the negative charge phase. Put differently, depending on various implementations and/or requirements, in some possible PFM switching cycle(s) the positive charge may be generated first (i.e., before the negative charge); while in some other possible PFM switching cycle(s) the negative charge may be generated first (i.e., before the positive charge), as long as (the magnitude of) the negative charge is smaller than or (at most) equal to (the magnitude of) the positive charge, thereby ensuring that the total net charge transfer to the output during a PFM switching cycle is reduced. As will be discussed in more detail below, in some possible implementations, the extent to which the net charge is reduced may be controlled (e.g., adaptively or continuously) in accordance with the change of the load current.

Configured as proposed above, broadly speaking, the present disclosure generally provides a technique/mechanism of operating a power converter (e.g., a digital buck converter) with improved efficiency especially at low load, particularly in cases when the PFM frequency has to be (e.g., artificially) enabled to be maintained above a (predetermined or predefined) minimum/threshold. In general, this is considered achievable by the reduction in the charge Q per PFM cycle, using both a positive and negative contributor to the total as proposed herein. This has the effect of reducing the value of I$_{LOAD}$ that can be supported whilst meeting the minimum PFM frequency requirement.

It should be noted that the apparatus (power converter) features described above correspond to respective method features that may however not be explicitly described, for reasons of conciseness. The disclosure of the present document is considered to extend also to such method features. In particular, the present disclosure is understood to relate to methods of operating the circuits described above, and/or to providing and/or arranging respective elements of these circuits.

It is to be further noted that examples of embodiments of the disclosure are applicable to various system configurations, depending on the underlining technical fields. In other words, the examples shown in the above described figures, which are used as a basis for the above discussed examples, are only illustrative and do not limit the present disclosure in any way. That is, additional further existing and proposed new functionalities available in a corresponding operating environment may be used in connection with examples of embodiments of the present disclosure based on the principles defined.

It should also be noted that the disclosed example embodiments can be implemented in many ways using hardware and/or software configurations. For example, the disclosed embodiments may be implemented using dedicated hardware, dedicated software, and/or hardware in association with software executable thereon. The components and/or elements in the figures are examples only and do not limit the scope of use or functionality of any hardware, software in combination with hardware, firmware, embedded logic component, or a combination of two or more such components implementing particular embodiments of the present disclosure.

Finally, it should be noted that the description and drawings merely illustrate the principles of the proposed circuits and methods. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A power converter operable in a pulse frequency modulation, PFM, mode, the power converted being configured for maintaining a PFM frequency above a predetermined frequency threshold when a load current at an output node of the power converter decreases, the power converter comprising an inductor,
    wherein the power converter is configured to, in a PFM switching cycle:
        during a positive charge phase of the PFM switching cycle, generate a positive charge across the inductor; and
        during a negative charge phase of the PFM switching cycle, generate a negative charge across the inductor smaller than or equal to the positive charge, such that a total net charge transferred to the output node during the PFM switching cycle is reduced, so as to maintain the PFM frequency above the predetermined frequency threshold,
    wherein the power converter further comprises:
        a high side switching device and a low side switching device coupled between an input node and a reference node of the power converter,
        wherein the inductor is coupled between the output node and an intermediate node that is arranged between the high side switching device and the low side switching device;
    wherein the power converter is configured to, during the positive charge phase:
        switch the high side switching device to an ON state for a first time period such that a positive charge current across the inductor is generated, thereby charging the inductor; and
        switch the low side switching device to the ON state for a second time period for discharging the inductor to zero current;
    wherein the power converter is further configured to, during the negative charge phase:
        switch the low side switching device to the ON state for a third time period, thereby generating a negative charge current across the inductor; and
        switch the high side switching device to the ON state for a fourth time period, thereby discharging the inductor until zero current across the inductor is reached; and
    wherein the power converter is configured to set the fourth time period as a first fixed ratio of the first time period, and to determine the third time period based on the fourth time period.

2. The power converter according to claim 1, wherein the power converter is configured to determine a peak negative current during the third and fourth time periods based on the fourth time period, and wherein the third time period is determined based on the peak negative current.

3. The power converter according to claim 1, wherein when setting the fourth time period as the first fixed ratio of the first time period is not sufficient for maintaining the PFM frequency above the predetermined frequency threshold, the power converter is further configured to set the fourth time period as a second fixed ratio of the first time period larger than the first fixed ratio.

4. The power converter according to claim 1, wherein the PFM switching cycle is triggered when an output voltage at the output node is below a predetermined voltage threshold.

5. The power converter according to claim 1, wherein the predetermined frequency threshold is 20 kHz.

6. The power converter according to claim 1, wherein the power converter is a digitally controlled buck converter.

7. A power converter operable in a pulse frequency modulation, PFM, mode, the power converted being configured for maintaining a PFM frequency above a predetermined frequency threshold when a load current at an output node of the power converter decreases, the power converter comprising an inductor,
    wherein the power converter is configured to, in a PFM switching cycle:
        during a positive charge phase of the PFM switching cycle, generate a positive charge across the inductor; and
        during a negative charge phase of the PFM switching cycle, generate a negative charge across the inductor smaller than or equal to the positive charge, such that a total net charge transferred to the output node during the PFM switching cycle is reduced, so as to maintain the PFM frequency above the predetermined frequency threshold,
    wherein the power converter further comprises:
        a high side switching device and a low side switching device coupled between an input node and a reference node of the power converter,
        wherein the inductor is coupled between the output node and an intermediate node that is arranged between the high side switching device and the low side switching device;
    wherein the power converter is configured to, during the positive charge phase:
        switch the high side switching device to an ON state for a first time period such that a positive charge current across the inductor is generated, thereby charging the inductor; and switch the low side switching device to the ON state for a second time period for discharging the inductor to zero current; and wherein the power converter is further configured to, during the negative charge phase:
switch the low side switching device to the ON state for a third time period, thereby generating a negative charge current across the inductor; and
switch the high side switching device to the ON state for a fourth time period, thereby discharging the inductor until zero current across the inductor is reached; and wherein the power converter is configured to adjust a peak negative current during the third and fourth time periods based on the PFM frequency, and to determine the third and fourth time periods based on the adjusted peak negative current.

8. The power converter according to claim 7, wherein the adjustment of the peak negative current involves increasing the peak negative current for maintaining the PFM frequency above the predetermined frequency threshold, and/or decreasing the peak negative current when the PFM frequency is above a predetermined hysteresis frequency threshold.

9. A method for operating a power converter in a pulse frequency modulation, PFM, mode, for maintaining a PFM frequency above a predetermined frequency threshold when a load current at an output node of the power converter decreases, the power converter comprising an inductor,
wherein the method comprises, in a PFM switching cycle:
during a positive charge phase of the PFM switching cycle, generating a positive charge across the inductor; and
during a negative charge phase of the PFM switching cycle, generating a negative charge across the inductor smaller than or equal to the positive charge, thereby reducing a total net charge transferred to the output node during the PFM switching cycle, so as to maintain the PFM frequency above the predetermined frequency threshold,
wherein the power converter further comprises:
a high side switching device and a low side switching device coupled between an input node and a reference node of the power converter,
wherein the inductor is coupled between the output node and an intermediate node that is arranged between the high side switching device and the low side switching device;
wherein the method further comprises, during the positive charge phase:
switching the high side switching device to an ON state for a first time period such that a positive charge current across the inductor is generated, thereby charging the inductor; and
switching the low side switching device to the ON state for a second time period for discharging the inductor to zero current; and
wherein the method further comprises, during the negative charge phase:
switching the low side switching device to the ON state for a third time period, thereby generating a negative charge current across the inductor; and
switching the high side switching device to the ON state for a fourth time period, thereby discharging the inductor until zero current across the inductor is reached; and wherein the method further comprises:
setting the fourth time period as a first fixed ratio of the first time period; and
determining the third time period based on the fourth time period.

10. The method according to claim 9, wherein the method comprises:
determining a peak negative current based on the fourth time period; and
wherein the third time period is determined based on the determined peak negative current.

11. The method according to claim 9, wherein the method further comprises:
when setting the fourth time period as the first fixed ratio of the first time period is not sufficient for maintaining the PFM frequency above the predetermined frequency threshold, setting the fourth time period as a second fixed ratio of the first time period larger than the first fixed ratio.

12. A non-transitory computer-readable storage medium storing a program comprising instructions that, when executed by a processor, cause the processor to carry out the method according to claim 9.

13. A method for operating a power converter in a pulse frequency modulation, PFM, mode, for maintaining a PFM frequency above a predetermined frequency threshold when a load current at an output node of the power converter decreases, the power converter comprising an inductor,
wherein the method comprises, in a PFM switching cycle:
during a positive charge phase of the PFM switching cycle, generating a positive charge across the inductor; and
during a negative charge phase of the PFM switching cycle, generating a negative charge across the inductor smaller than or equal to the positive charge, thereby reducing a total net charge transferred to the output node during the PFM switching cycle, so as to maintain the PFM frequency above the predetermined frequency threshold,
wherein the power converter further comprises:
a high side switching device and a low side switching device coupled between an input node and a reference node of the power converter,
wherein the inductor is coupled between the output node and an intermediate node that is arranged between the high side switching device and the low side switching device;
wherein the method further comprises, during the positive charge phase:
switching the high side switching device to an ON state for a first time period such that a positive charge current across the inductor is generated, thereby charging the inductor; and
switching the low side switching device to the ON state for a second time period for discharging the inductor to zero current; and
wherein the method further comprises, during the negative charge phase:
switching the low side switching device to the ON state for a third time period, thereby generating a negative charge current across the inductor; and
switching the high side switching device to the ON state for a fourth time period, thereby discharging the inductor until zero current across the inductor is reached; and
wherein the method comprises:
adjusting a peak negative current during the third and fourth time periods based on the PFM frequency; and determining the third and fourth time periods based on the adjusted peak negative current.

14. The method according to claim 13, wherein the adjustment of the peak negative current involves increasing the peak negative current value for maintaining the PFM frequency above the predetermined frequency threshold, and/or decreasing the peak negative current when the PFM frequency is above a predetermined hysteresis frequency threshold.

15. A non-transitory computer-readable storage medium storing a program comprising instructions that, when executed by a processor, cause the processor to carry out the method according to claim 13.

* * * * *